United States Patent [19]

Michas et al.

[11] Patent Number: 5,063,675

[45] Date of Patent: Nov. 12, 1991

[54] LOW PROFILE HACKSAW

[76] Inventors: Peter Michas, 3015 Shadid Dr., Colton, Calif. 92324; Fred Neal, Jr., Rte. 3, Box 455, Marshall, Tex. 75670

[21] Appl. No.: 407,454

[22] Filed: Sep. 14, 1989

[51] Int. Cl.⁵ .............................................. B27B 21/06
[52] U.S. Cl. ....................................... 30/513; 30/507
[58] Field of Search .................. 30/513, 524, 509, 507

[56] References Cited

U.S. PATENT DOCUMENTS

| 903,495 | 11/1908 | Parsons | 30/509 |
|---|---|---|---|
| 1,442,609 | 1/1923 | Greig | 30/513 |
| 2,213,841 | 9/1940 | Hubeck | 30/513 |
| 2,221,231 | 11/1940 | Cassidy | 30/513 |
| 2,298,643 | 10/1942 | Dodegge | 30/513 X |
| 2,959,203 | 11/1960 | Dreier | 30/513 |

Primary Examiner—Frank T. Yost
Assistant Examiner—Rinaldi Rada
Attorney, Agent, or Firm—Lalos & Keegan

[57] ABSTRACT

A hand held saw for use with hacksaw blades with a low profile frame including a reduced height support post and cross support member attached to the post a short distance from the blade. A screwdriver-type handle is attached at a right angle to the post to permit a horizontal hand grip. A simplified blade fastener extends longitudinally through the post to attach the blade to the handle, the body of the fastener being aligned with the length of the blade and axis of the handle.

11 Claims, 1 Drawing Sheet

U.S. Patent  Nov. 12, 1991  5,063,675
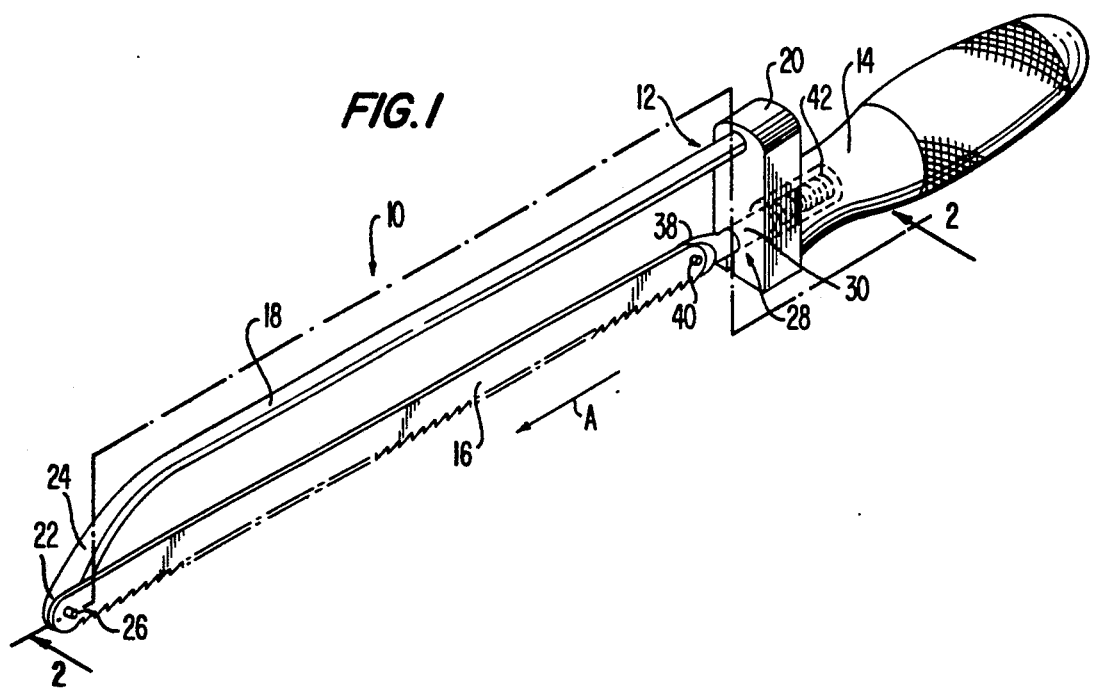
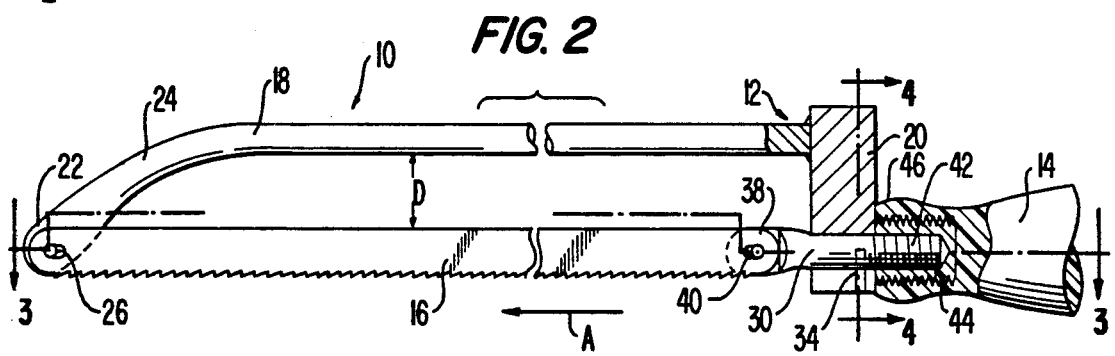
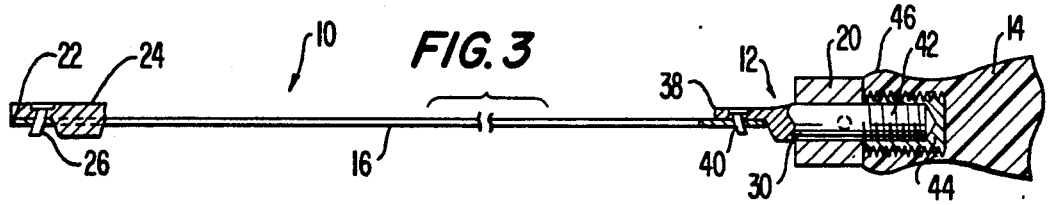
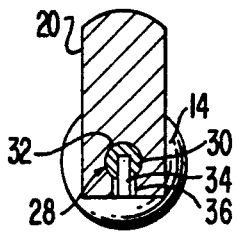

LOW PROFILE HACKSAW

BACKGROUND OF THE INVENTION

The present invention relates generally to hand held saws and more particularly to hacksaws.

Hacksaws utilize thin hacksaw blades and are usually employed to cut metal and other hard materials. Hacksaws are usually constructed in a rectangular frame with the handle corresponding to one vertical leg of the rectangular frame and the hacksaw blade forming one longitudinal leg of the rectangle. Hacksaws of this type are shown, for example, in U.S. Pat. Nos. 4,416,314, 4,466,471, 4,680,863, 4,571,829, 4,592,145, 4,367,779 and 4,079,763.

In these prior art hacksaws, the handle forms or is parallel to one vertical leg of the frame. The handle is tall enough to accommodate a hand grip with the fingers and thumb wrapped around the vertical post comprising the handle. As such, these devices have a relatively high profile, i.e. 4–5 inches in height. This high profile presents a distinct problem when using the saw in an environment with small clearances. In such environments, for example, around or under an automobile where metal clamps and bolts are fit into tight spaces, the hacksaw blade must be removed from the frame and be hand held to be of any use.

If the hacksaw blade is not rigidly supported on both ends it is quite ineffective in cutting metal. During the cutting motion, the thin blade tends to twist and slip. It is therefore important to provide a strong, rigid frame for the blade. In the prior art devices, a rigid support is provided by a large, rather cumbersome frame. Included in such frame are fairly complex, and space consuming mechanisms for releasing and securing the blade to the frame. Such release mechanisms increase the size, cost, and failure rate of prior art saws.

It is therefore an object of the present invention to provide a hacksaw with improved frame, handle, and release mechanism.

A further object of the invention is to provide a low-profile frame that provides a strong, rigid support for both ends of the hacksaw blade.

Another object of the invention is to provide a handle that is aligned longitudinally with the hacksaw blade to provide a horizontal hand grip that does not add to the height of the saw.

Still another object of the invention is to provide an improved release mechanism that is simple to manufacture and incorporate into the frame without increasing its size.

These and other objects and advantages of the present invention will become apparent to those having ordinary skill in the art from the subsequent detailed description of the preferred embodiment taken in conjunction with the accompanying drawings.

BRIEF DESCRIPTION OF THE DRAWINGS

FIG. 1 is a side elevational view of the preferred embodiment of the present invention.

FIG. 2 is a cross-sectional view taken along the lines 2—2 of FIG. 1.

FIG. 3 is a cross-sectional view taken along the lines 3—3 of FIG. 2.

FIG. 4 is a cross-sectional view taken along the lines 4—4 of FIG. 2.

DETAILED DESCRIPTION

Referring to the illustration of the present invention shown in FIGS. 1-3, the hacksaw, shown generally at 10, includes a frame 12, handle 14 and blade 16. The low profile frame 12 comprises a cross support bar 18 and vertical support post 20. Cross support bar 18 and vertical support post 20 may be made of chrome plated steel, or any suitably strong material, and can be connected by welding, for example. A steel frame of welded construction provides a strong rigid support for both ends of the thin metal blade 16.

Cross support bar 18 has a generally circular cross-section substantially along its entire length, with the exception of end 22 of arcuate section 24. End 22 is flattened to accept blade 16. Extending from flattened end 22 is mounting pin 26 that is angled in a forward direction, as best shown in FIG. 3. Pin 26 extends through a hole in a first end of blade 16. The cross support bar 18 with section 24 angled toward the blade 16 provides a very low profile support for blade 16 while still providing a rigid support due to its solid steel construction. The distance D (FIG. 2) separating bar 18 and blade 16 along its length is preferably 1½ inches or less. This unique construction permits the saw to be used in limited access areas while still supporting both ends of the saw.

Vertical support post 20 has a generally rectangular cross section except for a slightly rounded top. Post 20 being made of steel, like bar 18, provides a strong rigid support for blade 16. The height of post 20 is preferably less than 2¼ inches to limit the overall height of the saw. The bottom of post 20 includes a key-hole shaped slot 28, as best shown in FIG. 4. Extending through slot 28 is adjustable fastener 30. Fastener 30 has a generally circular cross section that fits within the circular portion 32 (FIG. 4) of slot 28. Extending from fastener 30 is a key pin 34 that fits within rectangular portion 36 (FIG. 4) of slot 28. Key pin 34 ensures proper alignment of fastener 30 within slot 28.

The forward end 38 of fastener 30 is cut away to provide a flattened surface to accept a second end of blade 16. Flattened end 38 is provided with pin 40 that extends through a hole in the second end of blade 16. As best shown in FIG. 2, pin 40 is angled in a rearward direction to inhibit blade 16 from being displaced laterally and removed when blade 16 is tensioned by fastener 30.

The rearward end of fastener 30 comprises a threaded shaft portion 42. Threaded shaft portion 42 is received in threaded hole 44 of handle 14. Threaded hole 44 may be a separate metal piece pressed fit within a cavity of hard plastic handle 14 or may be integrally formed with handle 14. In contrast to the prior art vertical or pistol-grip handles, handle 14 is formed to accept a horizontal hand grip. Handle 14 has a substantially cylindrical shape and may resemble or be identical to a standard screwdriver handle. The longitudinal axis of handle 14 is aligned with the length of blade 16 when connected to the saw, as shown in the figures. To remove blade 16, handle 14 is unscrewed from fastener 30, thereby permitting fastener 30 to be displaced lengthwise within slot 28. As handle 14 is unscrewed, fastener 38 can be moved forward, in the direction of arrow A shown in FIGS. 1 and 2. Forward movement of fastener 30 releases the tension on blade 16 permitting it to be displaced laterally and moved off of pins 26 and 40.

Blade 16 is attached by first placing it on pins 26 and 40, then screwing handle 14 onto fastener 30 until blade 16 is taut and the forward end 46 of handle 14 is drawn snugly against vertical support post 20. Turning handle 14 in a clockwise direction to tighten, or in a counterclockwise direction to loosen, effectively adjusts the distance between pins 26 and 40. The degree of adjustment will depend on the length of fastener 30 and the length of shaft portion 42 that can be received in handle hole 44. For example, the length of shaft portion 42 that can be received in handle hole 44 can be selected to be approximately 2 or 2½ This selection permits various blade sizes, e.g. 8 to 10 inches to be used with and secured to hacksaw 10.

The unique construction of fastener 30 permits it to be simply incorporated into frame 12 without increasing the size of the saw. Fastener 30, being longitudinally aligned with the horizontal axis of handle 14 and length of blade 16, does not contribute to the height of hacksaw 10, thus enhancing the low profile construction. Fastener 30 can be formed from a single piece of steel longitudinally displaceable within slot 32 of post 20. This simple construction is easy and inexpensive to manufacture, yet provides the strength and rigidity required for blade 16 to be effective.

The various pieces of hacksaw 10, i.e. bar 18, post 20, and fastener 30 may be made of any suitably strong material, including hard plastic or aluminum, as long as thin blade 16 is sufficiently supported so that it does not flex or twist when used for cutting.

The present invention can be used in standard applications but is especially useful in limited access cutting operations. Several features of the present invention contribute to its low-profile advantage. These include the angled cross support bar attached on the support post close to the blade, the low height support post, the screwdriver-type handle attached at a right angle to the support post rather parallel to it, and the blade fastener fitting in the support post and being aligned with the length of the blade and axis of the handle.

It is intended that the above description and drawings be interpreted as illustrative and not in a limited sense. Changes can be made in the above construction without departing from the spirit and scope of the present invention, as defined by the following claims.

We claim:

1. A hand held saw utilizing a hacksaw blade for cutting comprising:
    a handle;
    a vertical support post;
    a fastener for connecting said handle and said support post, said fastener including a first means for connecting said blade to said saw;
    a cross support bar attached at a first end to said support post, said cross support bar having a second means for connecting said blade to said saw at a second end of said support bar, wherein said support bar is substantially parallel to said blade when said blade is connected to said saw, except for an arcuate section of said support bar that is angled toward said blade when said blade is connected to said second end of said support bar;
    said support post having a generally rectangular cross section and being of solid metal except for a slot for receiving said fastener;
    said slot including a circular portion and a rectangular portion; and wherein said fastener has a substantially cylindrical body that passes through said circular slot portion and a pin extending from said body that passes through said rectangular slot portion to properly align said fastener in said support post.

2. A hand held saw according to claim 1 wherein said handle has a generally cylindrical shape with the longitudinal axis of said handle being substantially aligned with the length of said blade when connected to said saw.

3. A hand held saw according to claim 1 wherein the height of said vertical support post is less than 2½ inches.

4. A hand held saw according to claim 1 wherein said cross support bar and said blade, are separated by a fixed distance along a substantial length of said blade when said blade is connected to said saw and said fixed distance does not exceed 1½ inches.

5. A hand held saw according to claim 1 wherein said support post and said support bar are made of steel to provide rigid support for said hacksaw blade.

6. A hand held saw according to claim 5 wherein said support post and said support bar are connected by welding.

7. A hand held saw according to claim 1 wherein said fastener has a first end having said first means for connecting said blade and a second end including handle connecting means for connecting said fastener to said handle.

8. A hand held saw according to claim 7 wherein said handle connecting means includes a threaded shaft portion of said fastener.

9. A hand held saw according to claim 8 wherein said handle includes a threaded hole for cooperative engagement with said threaded shaft portion, thereby permitting said handle to be screwed on to and off from said fastener.

10. A hand held saw according to claim 9 wherein said fastener is drawn through said slot in a first direction away from said second end of said support bar when said handle is screwed on to said fastener.

11. A hand held saw according to claim 10 wherein said fastener is displaceable through said slot in a second direction toward said second end of said support bar when said handle is screwed off from said fastener.

* * * * *